Inventor
Charles P. Price
By Sturtevant & Mason
Attorneys

UNITED STATES PATENT OFFICE.

CHARLES P. PRICE, OF BOSTON, MASSACHUSETTS, ASSIGNOR TO AMERICAN TAR COMPANY, OF BOSTON, MASSACHUSETTS, A CORPORATION OF MASSACHUSETTS.

SPRAYING APPARATUS.

1,387,071.  Specification of Letters Patent.  Patented Aug. 9, 1921.

Application filed May 13, 1918. Serial No. 234,218.

*To all whom it may concern:*

Be it known that I, CHARLES P. PRICE, a citizen of the United States, residing at Boston, in the county of Suffolk, State of Massachusetts, have invented certain new and useful Improvements in Spraying Apparatus, of which the following is a description, reference being had to the accompanying drawing and to the figures of reference marked thereon.

The invention relates to new and useful improvements in a spraying apparatus and more particularly to an apparatus which is adapted for spraying on a road surface bituminous materials or other road surfacing materials which require heating in order to liquefy the same for free spraying.

Prior to my invention tank wagons have been provided with an outlet having controlling valves and a spraying device for spraying bituminous materials. Means has also been provided for heating the material in the outlet pipe for preventing the bituminous material from congealing. This has been usually accomplished by utilizing live steam, the steam being injected into the outlet pipe at a point between the valve and the tank. The introduction of live steam into certain classes of materials such as asphaltic materials often causes serious foaming of the materials.

An object of the present invention is to provide means for heating the interior of the outlet pipe between the main valve in the outlet pipe and the tank by a steam heating means which is closed to the material in the outlet pipe so that no live steam or moisture resulting from the condensation of the steam used for heating the outlet pipe will come in contact with the material in the outlet pipe or tank; and also to provide an efficient means for heating the material so that every particle of the material will be thoroughly heated and liquefied to facilitate the delivery of the material through the valves and the spray nozzles.

A further object of the invention is to provide a heating means of the above character wherein the steam passing through the heating means may be discharged into the outlet pipe at a point beyond the main valve for blowing out and cleaning the spraying devices.

In the drawings:—

The invention is directed broadly to a heating means for an outlet pipe of a tank wagon equipped for spraying certain grades of asphaltic materials or the like which require heating in order to liquefy the same for free spraying. It is well known that materials of this kind are liable to congeal in the outlet pipe, wholly or in part, so as to clog the valves and stop the free flow of the materials from the spray nozzles. The present invention is directed particularly to the heating means for preventing the congealing of the materials and for the thorough heating and liquefying of the same as it passes through the outlet pipe so as to facilitate the delivery of the material through the valves and the spray nozzles. This heating means includes a heating device such as a heating drum or heating coil which is located in the outlet pipe between the valve and the tank. The extended radiating surface of the heating drum or heating coil thoroughly heats the bituminous material passing through the outlet pipe so as to liquefy every particle thereof. It also heats the parts of the valves through the intense heating of the material passing through the outlet pipe and thus maintains an efficient flow of the material through the valve. This intense heating of the material also insures that the material will not congeal even in limited areas so as to prevent free spraying of the same from the nozzles. It is understood, of course, that the tank wagon is equipped with the usual heating coils for heating the body of the material therein. The heating drum or heating coil receives steam from a suitable source of supply and the drum or coil is closed to the material, the steam being taken from the coil or drum by a pipe which extends out through the wall of the outlet pipe. This discharge pipe for the steam from the heating drum or coil is also preferably led into the outlet pipe beyond the main valve so that the steam may be discharged into the outlet pipe beyond the valve for blowing out the spraying means.

Figure 1:
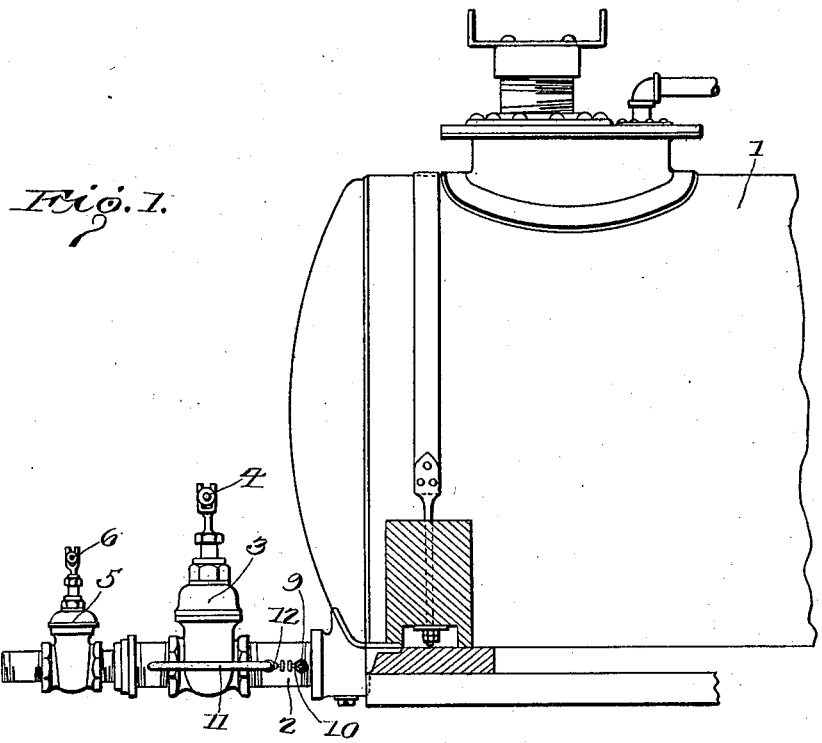
Figure 1 is a view partly in side elevation and partly in section showing a portion of a tank wagon having my improved heating means for the outlet pipe applied thereto.
Figure 2:
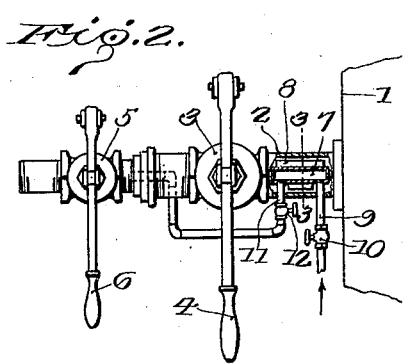
Fig. 2 is a view partly in plan and partly in section of the same.
Figure 3:
Fig. 3 is a sectional view on the line 3—3 of Fig. 2.

Referring more in detail to the drawings, I have shown my invention as applied to a tank wagon having a supply tank 1 which may be of any desired construction. Attached to the tank 1 adjacent the rear end thereof is an outlet pipe 2. Located in this outlet pipe is a main valve 3 which may be of any desired construction but preferably of the lift type operated by a lever indicated at 4 in the drawings. Also located in the outlet pipe is a valve 5 which is of similar construction and operated by a lift lever 6. Disposed in the outlet pipe 2 between the main valve 3 and the tank 1 as shown in Figs. 1, 2 and 3 of the drawings, is a heating drum 7. This heating drum is circular in cross section and is provided with a series of radiating vanes 8 (see Figs. 2 and 3). These radiating vanes operate to distribute the heat and aid materially in the heating of the interior of the outlet pipe. It will be noted that the vanes 8 are radial and extend longitudinally of the drum and of the outlet pipe and I am thereby enabled to provide a large radiating surface without materially interfering with the free flow of the material through the outlet pipe which passes along the drum between the radial vanes.

Steam is led to the heating drum by a steam pipe 9 provided with a hand valve 10. Steam is exhausted from the heating drum through a steam pipe 11 which extends through the wall of the outlet pipe and in this steam pipe there is a hand valve 12. The exhaust pipe 11 preferably extends around the main valve 3 and enters the outlet pipe beyond the main valve. This exhausts steam into the outlet pipe between the main valve 3 and the auxiliary valve 5.

From the above it will be apparent that steam is conveyed to the heating drum and away from the heating drum and that the heating drum is closed to the materials within the outlet pipe so that no live steam or moisture due to the condensation of the steam comes in contact with the asphaltic materials.

The heating drum will thoroughly heat the interior of the outlet pipe and the material passing through the same. The material as a body is heated in the tank and any tendency of the material to congeal in whole or in part as it passes through the more or less restricted area of the outlet pipe is prevented by this heating drum which thoroughly heats the material, liquefying every particle thereof and the heat from the drum together with the intense heat stored in the material passing in and about the parts of the drum will heat the parts of the valve and insure a free flow of the thoroughly liquefied material through the valve. The drum will also heat the material sufficiently so as to maintain the same thoroughly liquefied and insure the free flow of the same through the auxiliary valve and the pipes leading therefrom to the nozzles. By closing the auxiliary valve 5 and opening the main valve 3, live steam may also be discharged into the outlet pipe and blow the contents thereof back into the tank. Then, again, by closing the main valve 3 and opening the auxiliary valve 5, the exhaust steam will pass out through the spraying devices and thoroughly free the same from the materials which tend to congeal therein.

Figure 4:
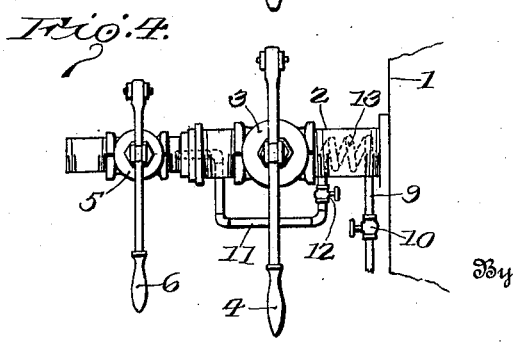
Fig. 4 is a view in plan showing a slightly modified form of heating means.

In Fig. 4 I have shown a slightly modified form of the invention in which I have substituted for the heating drum 7 a heating coil 13. Otherwise this form of the apparatus is similar in construction to that described in connection with Figs. 1 to 3.

In Figs. 1 to 4 of the drawings, I have shown the steam as brought to the heating drum or coil from an outside source by a steam pipe extending directly through the outer wall of the outlet pipe.

Figure 5:
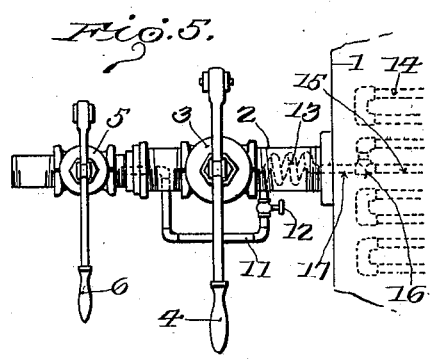
Fig. 5 is a view similar to Fig. 4 but showing a slightly modified arrangement of supplying steam to the heating means.

In Fig. 5 of the drawings I have shown a slightly modified arrangement of the supply pipe which furnishes steam to the coil, indicated at 13. The tank is provided with a series of heating coils 14 which are furnished with steam from a suitable supply and in this form of the invention the pipe 15 of the heating coils 14 is provided with a T-coupling 16 and the supply pipe 17 for the coil 13 is connected to this T-coupling. In this form of the invention, the steam is taken from the heating coils in the tank directly but it will be noted that the heating coil is closed to the material so that no live steam escapes into the material and no moisture due to the condensing of the steam comes into contact with the material which may cause objectionable foaming of the material in the tank.

It is obvious that other modifications and arrangement of the heating means may be made without departing from the spirit of the invention, the essential feature consisting of the heating element located within the outlet pipe at a point between the main valve and the tank and the conveying of the steam to and from the heating element so that no steam comes in contact with the material in the tank.

Having thus described my invention, what I claim as new and desire to secure by Letters Patent, is:—

1. The combination with a tank wagon having an outlet pipe, a main valve for controlling the outlet pipe and an auxiliary valve in said outlet pipe beyond the main valve, of steam heated means located in the outlet pipe between the tank and the main valve and means for conducting steam to and from said heating means, said last named means being closed to the material in the outlet pipe and tank whereby the steam or moisture due to the condensing of the steam is prevented from coming in contact with said material, said means for conducting the steam from the heating means including a pipe discharging the steam into the outlet pipe between the main valve and the auxiliary valve.

2. The combination with a tank wagon having an outlet pipe and a controlling valve therefor adjacent the tank, of a heating drum located centrally of the outlet pipe and extending longitudinally thereof between the main valve and the tank, a steam pipe connected to the drum for supplying the same with steam, a steam pipe connected with the drum through which the steam is discharged therefrom, said last named pipe extending outwardly through the outlet pipe.

3. The combination with a tank wagon having an outlet pipe and a controlling valve therefor adjacent the tank, of a heating drum located centrally of the outlet pipe and extending longitudinally thereof between the main valve and the tank, a steam pipe connected to the drum for supplying the same with steam, a steam pipe connected with the drum through which the steam is discharged therefrom, said last named pipe extending outwardly through the outlet pipe, said drum being provided with radial vanes formed integral with the drum and extending longitudinally thereof.

In testimony whereof, I affix my signature, in the presence of two witnesses.

CHARLES P. PRICE.

Witnesses:
HARRY BARWISE,
J. E. McGUIRE.